UNITED STATES PATENT OFFICE 2,112,223

HALOGENATED PYRIDINE DERIVATIVES AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application March 15, 1937, Serial No. 131,107. In Germany April 25, 1936

9 Claims. (Cl. 260—42)

It has been found that by reacting halogens on 2,4-dioxo-3,3-dialkyl-tetrahydropyridines of the general formula

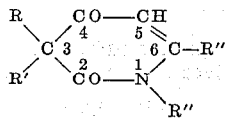

wherein R and R' represent the same or different saturated alkyl groups, R'' hydrogen or methyl, the hydrogen in position 5 can be smoothly substituted by halogen. The reaction proceeds in exactly the same manner with the 1- or 6-methyl-, or 1,6-dimethyl compounds and results in the formation of compounds of the same type. The starting materials are obtained by the processes described in German Patents No. 634,284, No. 637,385 and No. 638,532. It is surprising that in these reactions substitution occurs and not addition. The behaviour does not resemble that of pyridine since the halogenation proceeds rapidly and readily under very mild conditions. The halogenations are therefore preferably carried out at low temperatures in presence of solvents. The resulting new halogenated compounds crystallize well and are easily soluble in the usual organic solvents. The chlorine compounds are colourless, the bromine compounds mostly pale yellowish, whereas the iodine compounds are of a distinct yellow colour; even the latter are stable to light. The 2,4-dioxo-3,3-dialkyl-5-halogen-tetrahydropyridines as well as the 2,4-dioxo-3,3-dialkyl-5-halogen-6-methyl-tetrahydropyridines dissolve unchanged in aqueous alkalies giving a yellowish solution. The new compounds exert a soporific action, in some cases even in small doses. They can also be used as intermediate products for the manufacture of medicines.

Example 1

167 parts by weight of 2,4-dioxo-3,3-diethyl-tetrahydropyridine are dissolved in 700 parts by volume of 80% acetic acid. The solution is cooled with ice externally and well stirred while 71 parts by weight of chlorine are introduced. The chlorine is immediately taken up. After the absorption is completed the solution is evaporated almost to dryness under reduced pressure and the residue made into a paste with water whereupon the 2,4-dioxo-3,3-diethyl-5-chlorine-tetrahydropyridine immediately crystallizes and is separated from the aqueous liquid. To complete purification the product can be recrystallized from dilute methanol. The resulting colourless crystals melt at 116–117° C.

Example 2

167 parts by weight of 2,4-dioxo-3,3-diethyl-tetrahydropyridine are dissolved in 700 parts by volume of methylene chloride with stirring. To this solution a solution of 160 parts by weight of bromine in 300 parts by volume of methylene chloride is slowly added with continuous stirring. The temperature is kept between 5 and 15° C. The bromine disappears at once and soon hydrogen bromide begins to escape. After having added all the bromine drop by drop the methylene chloride is evaporated. The 2,4-dioxo-3,3-diethyl-5-bromo-tetrahydropyridine remains as a solid mass. For purification it may, for instance, be dissolved in benzene and crystallizes on addition of a little petroleum ether. The recrystallized compound forms pale yellowish needles melting at 111–112° C.

Example 3

167 parts by weight of 2,4-dioxo-3,3-diethyl-tetrahydropyridine are stirred in 750 parts by volume of about 25% aqueous ammonia. A solution of 254 parts by weight of iodine in 200 parts by weight of potassium iodide and 200 parts by volume of water is added drop by drop. The iodine disappears at once. The starting compound gradually goes into solution and in its place 2,4-dioxo-3,3-diethyl-5-iodo-tetrahydropyridine precipitates as a solid. It is separated from the liquid and washed with water. The portion remaining dissolved in the mother liquor can be recovered by concentration under reduced pressure and acidification of the residue. The new compound is recrystallized from dilute methanol. It melts at 117–118° C.

Example 4

To a solution of 181 parts by weight of 1-methyl-2,4-dioxo-3,3-diethyl-tetrahydropyridine in 600 parts by volume of chloroform 160 parts by weight of bromine in 300 parts by volume of chloroform are added dropwise at a temperature of about +10° C. while stirring. The bromine disappears immediately and hydrogen bromide is evolved. After evaporating the chloroform 1-methyl-2,4-dioxo-3,3-diethyl-5-bromo-tetrahydropyridine remains as a solid which can be dissolved in about the same quantity by weight of dibutyl-ether and allowed to crystallize. The bromine compound melts at 80–81° C.

Example 5

195 parts by weight of 2,4-dioxo-3,3-di-n-propyl-tetrahydropyridine are dissolved in 900 parts by volume of 70% acetic acid. While stirring, 71 parts by weight of chloride are introduced into the solution and the temperature of the solution is kept below +10° C. by cooling. As soon as all the chlorine has been introduced 2,4-dioxo-3,3-di-n-propyl-5-chlorine-tetrahydropyridine can be isolated by removing the solvent by evaporation and rubbing the residue with water, whereupon it soon solidifies. After recrystallizing from dilute methanol the completely pure compound melts at 74–75° C.

*Example 6*

209 parts by weight of 2,4-dioxo-3,3-di-n-propyl-6-methyl-tetrahydropyridine are dissolved in 900 parts by volume of 80% acetic acid with stirring. The solution is cooled and 160 parts by weight of bromine dissolved in 300 parts by volume of 80% acetic acid are added dropwise at about 10° C. 2,4-dioxo-3,3-di-n-propyl-5-bromo-6-methyl-tetrahydropyridine crystallizes on dilution with water. It can be recrystallized from dilute ethyl alcohol. It melts at 141–142° C.

Similarly, 2,4-dioxo-3,3-n-butyl-n-propyl-5-bromo-tetrahydropyridine (melting point 88–89° C.) can be obtained from 2,4-dioxo-3,3-n-butyl-n-propyl-tetrahydropyridine, and 1,6-dimethyl-2,4-dioxo-3,3-di-n-propyl-5-bromo-tetrahydropyridine (melting point 86–87° C.) from 1,6-dimethyl-2,4-dioxo-3,3-di-n-propyl-tetrahydropyridine.

*Example 7*

Iodine mono-chloride is prepared in the usual manner from 127 parts by weight of iodine and 35.5 parts by weight of chlorine and dissolved in 400 parts by volume of glacial acetic acid. This solution is added dropwise to a cooled solution of 209 parts by weight of 2,4-dioxo-3,3-di-n-propyl-6-methyl-tetrahydropyridine in 1000 parts by volume of glacial acetic acid which is well stirred. Iodine is absorbed at once. When the reaction is completed 2,4-dioxo-3,3-di-n-propyl-5-iodo-6-methyl-tetrahydropyridine can be separated in crystalline form by diluting with water. It is recrystallized from about 70% methanol, and then forms yellowish crystals melting at 127–128° C.

I claim:

1. Halogenated pyridine derivatives of the general formula

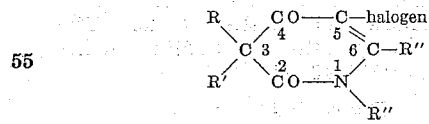

wherein R and R' represent lower saturated alkyl radicals and R'' represents radicals selected from the group consisting of hydrogen and methyl radicals.

2. 2,4-dioxo-3,3-diethyl-5-bromo-tetrahydropyridine forming pale yellowish needles melting at 111–112° C.

3. 1-methyl-2,4-dioxo-3,3-diethyl-5-bromo-tetrahydropyridine forming yellowish crystals melting at 80–81° C.

4. Process for the manufacture of halogenated pyridine derivatives of the general formula

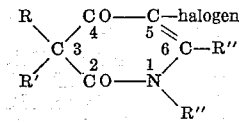

wherein R and R' represent lower saturated alkyl radicals, and R'' represents radicals selected from the group consisting of hydrogen and methyl radicals, which consists in reacting a halogen with 2,4-dioxo-3,3-dialkyl-tetrahydropyridines of the general formula

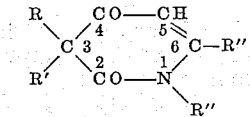

5. Process for the manufacture of halogenated pyridine derivatives of the general formula

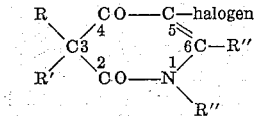

wherein R and R' represents lower saturated alkyl radicals, and R'' represents radicals selected from the group consisting of hydrogen and methyl radicals, which consists in reacting a halogen with 2,4-dioxo-3,3-dialkyl-tetrahydropyridines of the general formula

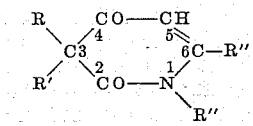

in a solvent.

6. Process for the manufacture of 2,4-dioxo-3,3-diethyl-5-bromo-tetra-hydropyridine which consists in reacting bromine with 2,4-dioxo-3,3-diethyl-tetrahydropyridine.

7. Process for the manufacture of 2,4-dioxo-3,3-diethyl-5-bromo-tetra-hydropyridine which consists in reacting bromine with 2,4-dioxo-3,3-diethyl-tetrahydropyridine in a solvent.

8. Process for the manufacture of 1-methyl-2,4-dioxo-3,3-diethyl-5-bromo-tetrahydropyridine which consists in reacting bromine with 1-methyl-2,4-dioxo-3,3-diethyl-tetrahydropyridine.

9. Process for the manufacture of 1-methyl-2,4-dioxo-3,3-diethyl-5-bromo-tetrahydropyridine which consists in reacting bromine with 1-methyl-2,4-dioxo-3,3-diethyl-tetrahydropyridine in a solvent.

OTTO SCHNIDER.